(12) United States Patent
Mayr

(10) Patent No.: US 9,062,766 B2
(45) Date of Patent: Jun. 23, 2015

(54) LOCKING APPARATUS

(75) Inventor: Karlheinz Mayr, Bregenz (AT)

(73) Assignee: ZF Friedrichshafen AG, Friedrichshafen (DE)

( * ) Notice: Subject to any disclaimer, the term of this patent is extended or adjusted under 35 U.S.C. 154(b) by 1411 days.

(21) Appl. No.: 12/065,940

(22) PCT Filed: Nov. 14, 2006

(86) PCT No.: PCT/EP2006/010876
§ 371 (c)(1),
(2), (4) Date: Mar. 6, 2008

(87) PCT Pub. No.: WO2007/068314
PCT Pub. Date: Jun. 21, 2007

(65) Prior Publication Data
US 2008/0236967 A1 Oct. 2, 2008

(30) Foreign Application Priority Data

Dec. 17, 2005 (DE) .......................... 10 2005 060 583

(51) Int. Cl.
| | |
|---|---|
| F16F 9/32 | (2006.01) |
| F16H 63/34 | (2006.01) |
| F15B 15/26 | (2006.01) |
| F16D 127/06 | (2012.01) |

(52) U.S. Cl.
CPC ........ *F16H 63/3475* (2013.01); *F16D 2127/06* (2013.01); *F15B 15/261* (2013.01); *F16H 63/3433* (2013.01); *F16H 63/3483* (2013.01)

(58) Field of Classification Search
CPC ............ F16D 2127/06; F16D 2121/12; F16D 2121/582

USPC .............. 188/265, 300, 67, 69, 31; 91/41–45; 92/15–23; 74/335; 403/326–329, 403/DIG. 14

See application file for complete search history.

(56) References Cited

U.S. PATENT DOCUMENTS

| | | | | |
|---|---|---|---|---|
| 3,436,107 | A | * 4/1969 | Karden .......................... | 403/315 |
| 3,778,175 | A | * 12/1973 | Zimmer ........................ | 403/187 |
| 3,858,988 | A | * 1/1975 | Cohen ............................. | 403/18 |
| 4,024,800 | A | 5/1977 | Masclet | |
| 4,898,493 | A | * 2/1990 | Blankenburg ................. | 403/326 |

(Continued)

FOREIGN PATENT DOCUMENTS

| | | |
|---|---|---|
| DE | 952 575 | 11/1956 |
| DE | 1 426 553 | 11/1968 |

(Continued)

*Primary Examiner* — Vishal Sahni
(74) *Attorney, Agent, or Firm* — Davis & Bujold, P.L.L.C.; Michael J. Bujold

(57) ABSTRACT

A locking apparatus, particularly of a parking brake device for a vehicle with an automatic transmission, which has a piston unit positioned inside a housing and is axially displaced and locked in a pre-defined axial position, and a catch device that automatically activates when the piston unit is locked to hold the piston unit. The catch device has at least one spring arm actively connected with the piston unit when the piston unit is locked, the spring arm abuts the piston unit in locked position with a catch area. The spring arm has a recess in a longitudinal plane of the spring arm. The piston unit penetrates the recess of the spring arm at least approximately in a radial direction with a section that forms the catch area, so that when the piston unit is locked, the catch area within the longitudinal plane of the spring arm.

20 Claims, 11 Drawing Sheets

(56) References Cited

U.S. PATENT DOCUMENTS

| | | | |
|---|---|---|---|
| 5,127,762 A * | 7/1992 | Havlovitz | 403/298 |
| 5,540,138 A | 7/1996 | Robbins, Jr. | |
| 6,042,161 A * | 3/2000 | Mantarakis et al. | 292/253 |
| 6,292,979 B1 * | 9/2001 | Kuo | 16/113.1 |
| 6,471,027 B1 * | 10/2002 | Gierer et al. | 192/219.5 |
| 6,508,161 B2 * | 1/2003 | Suzuki et al. | 92/23 |
| 6,802,426 B2 * | 10/2004 | Weaver et al. | 211/192 |
| 6,854,919 B2 * | 2/2005 | Neumann et al. | 403/326 |
| 2004/0011609 A1 * | 1/2004 | Schmid | 188/265 |
| 2005/0098400 A1 * | 5/2005 | Kleinert et al. | 188/300 |

FOREIGN PATENT DOCUMENTS

| | | |
|---|---|---|
| DE | 25 05 358 | 10/1975 |
| DE | 29 47 351 | 6/1980 |
| DE | 87 06 692 U1 | 10/1988 |
| DE | 103 47 667 A1 | 4/2004 |
| EP | 1 408 260 A1 | 4/2004 |
| GB | 1076423 | 7/1967 |
| GB | 2 039 587 A | 8/1980 |

\* cited by examiner

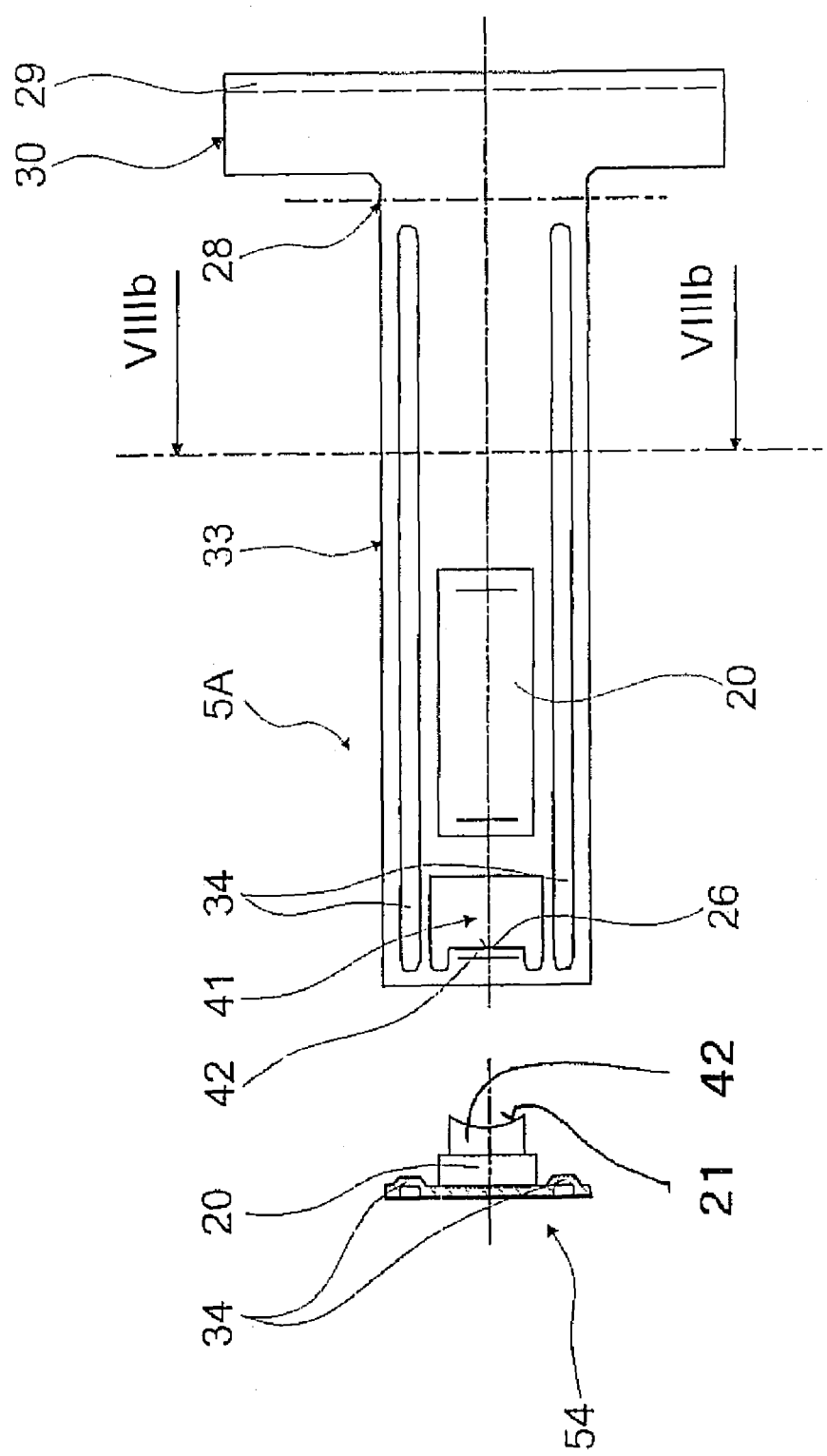

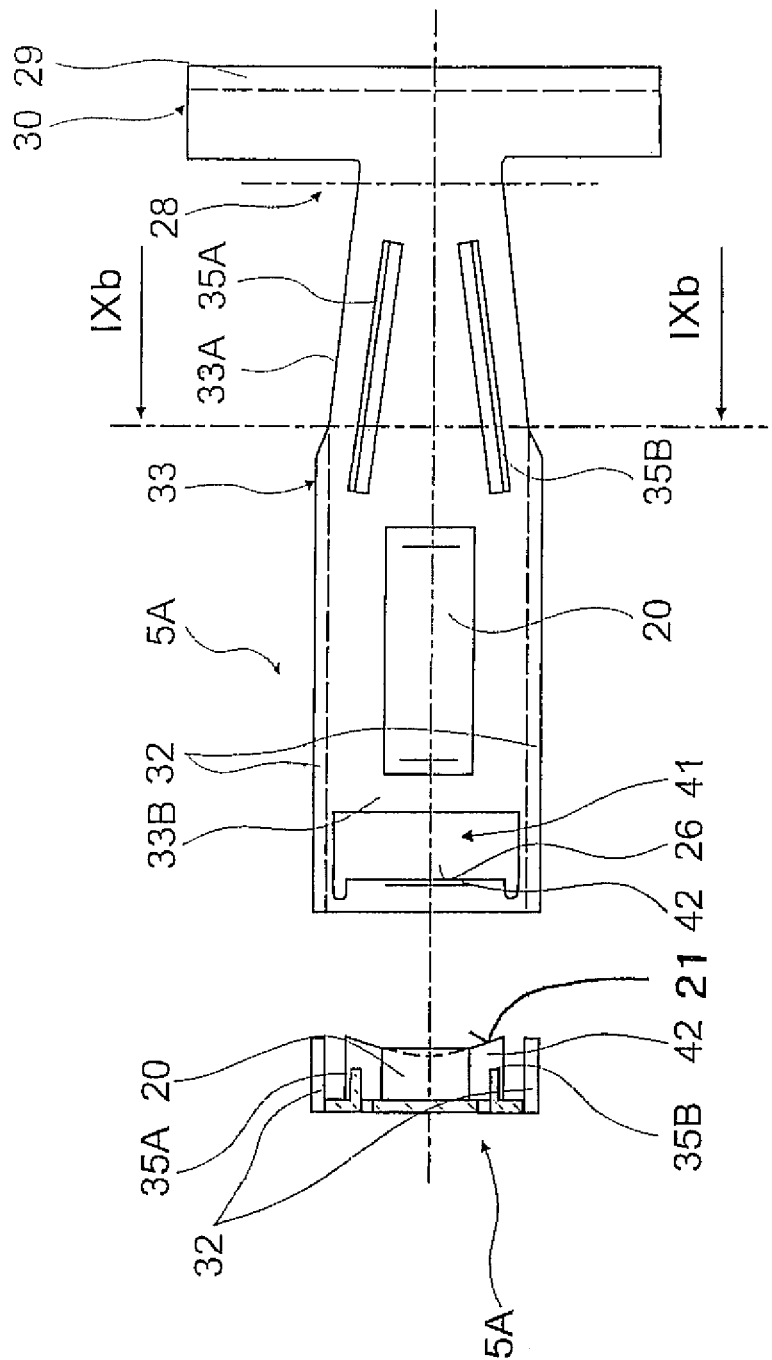

LOCKING APPARATUS

This application is a national stage completion of PCT/EP2006/010876 filed Nov. 14, 2006, which claims priority from German Application Serial No. 10 2005 060 583.4 filed Dec. 17, 2005.

FIELD OF THE INVENTION

The invention relates to a locking apparatus, particularly a parking brake device for a vehicle whose drivetrain is equipped with an automatic transmission.

BACKGROUND OF THE INVENTION

DE 103 47 667 A1 and EP 1 408 260 A1 establish a locking device for locking the movement of a piston. The electromagnet anchor and/or its armature rod engage an actuating element which, in turn, interacts with a catch element in such a manner that the catch element in a locked position blocks the movement of the piston and/or the catch element in an unlocked position releases the movement of the piston.

The actuating element is specifically pre-ensioned, the tension acting in a radial direction toward the piston rod. The actuating element is furthermore either designed as a plastic component, which is sprayed or clipped on the yoke of the electromagnet or formed as a punched component, which is fastened to the yoke, via a tension spring, that is designed to increase the pre-tensioning of the actuating element.

The design of the actuating element as a sprayed-on or clipped-on plastic component has the disadvantage that it requires an actuating element with thick walls and requires a large overlap region in the effective range, between the catch element and the actuating element, in order to provide the necessary holding forces, which are generally high for parking brake devices. This is undesirable, however, since particularly in vehicle transmissions the available space is extremely limited.

Furthermore, the design of the actuating element as a punched component that is fastened to the yoke with a tension spring has the disadvantage that, in order to assure the functioning of the locking apparatus, high demands are placed on the manufacturing tolerances. The actuating element is also designed over its entire length with component elasticity such that one end of the actuating element, which cooperates with the catch element, can radially pivot with respect to the other element that is fastened to the yoke. This component elasticity, however, leads to undesirable deformation of the actuating element in the engagement area of the bolt such that de-activation of the effective connection, between the actuating element and the catch element, is not possible.

DE 25 05 358 A1 discloses an actuating and bracing jack in which a hollow piston rod is displaceably positioned. The piston rod is activated in the usual by a pressure medium is supplied to the cylinder through an opening. Several elastic, radially suspended, catch elements are also provided in the cylinder and extend in the longitudinal direction of a chamber. The piston rod has a ring-shaped bulge on which the catch elements can slide and open.

The side of the bulge, facing the piston, is designed in such a manner that in interaction with the approximately hook-shaped ends of the catch elements it will lock the cylinder and piston rod, but also allow it to be released. The position of the bulge is chosen so that when the piston rod contacts the bottom, the catch elements snap behind the bulge and against its surface. In order to keep the catch elements in their locked position, an approximately tubular part is provided as a locking element that is guided inside a chamber in a liquid-tight manner and encloses the catch elements in a first position and thereby holds them tight against the surface of the bulge.

This poses a disadvantage that, in their locked condition, the catch elements and the piston rod rest against one another in such a manner that the holding force, which is in effect during locking, creates a bending moment within the catch elements, which can only be counteracted by a corresponding bending stiffness of the catch elements so that the catch elements must be dimensioned accordingly. This has the disadvantage of high manufacturing costs, a high component weight and large installation space.

A locking apparatus for two elements, which are displaceable with respect to one another by a pressure medium, such as a displacement piston and a cylinder of a lift or displacement device that is operated by a pressure medium is known from DE 952 575 B. It provides that, under the action of the pressure medium when a certain position has been reached by an element member, e.g., the ram piston, in relation to the other member, e.g., the cylinder, that the one element is lockable by a projecting piece disposed thereon and locking elements, which are connected to one of the two elements and are actuated by a control element.

The disadvantage here as well is that, in a locked condition, a bending force is transferred into the locking elements, which can only be counteracted by dimensioning the locking elements to an extent that assures the functioning of the locking apparatus.

U.S. Pat. No. 5,540,138 establishes a locking apparatus in which a piston that is provided with a piston rod opposite a cylinder that receives the piston can be locked by several locking elements that are elastically disposed along the circumference of the piston.

The locking elements are fastened at one end to the housing and/or fixed to the cylinder and, at the other end, in relation to an outer diameter of the piston, designed to pivot around the bearing point on the housing side. Here the free ends of the locking elements have protrusions on the side facing the piston, the protrusions engaging a ring-shaped section of the piston.

The above described embodiments of the locking elements and the piston, when the piston is in locked condition, will allow a bending force to be applied to the locking elements which deforms the locking elements, between the bearing point and the protrusions, potentially to an extent that significantly degrades the functioning of the locking apparatus if the locking apparatus lacks a certain bending stiffness. Such a bending stiffness can only be achieved with a locking apparatus that exhibit large component dimensions and are, therefore, distinguished by a large installation space.

Therefore, the invention has the purpose of providing a locking apparatus that requires only a small installation space and can be manufactured in an economical manner.

The locking apparatus, according to the invention, particularly a parking break device of a vehicle whose drivetrain is equipped with an automatic transmission, has an axially displaceable piston unit that is positioned inside a housing and can be locked in a pre-defined axial position, as well as a catch device that automatically activates in the locked position of the piston unit in order to hold the piston unit. The catch device is designed with at least one spring arm, which is actively connected to the piston unit in the locked position, the piston unit abutting the spring arm in locked position with a catch area.

According to the invention, the spring arm is designed with a recess disposed in a longitudinal plane and the piston unit at least approximately intersects the recess of the spring arm in a radial direction with a section that forms the catch area so that the catch area of the piston unit in a locked position is at least positioned in an area close to the longitudinal plane of the spring arm, preferably in the longitudinal plane of the spring arm.

In this way it is advantageously achieved that a holding force, which engages the piston unit when the locking apparatus is locked, is transferred with a small lever arm or directly into the spring arm, such that essentially little or no bending moment is applied to the spring arm from the load.

The advantageous result is that owing to the reduced loads in comparison with locking apparatuses, known from the prior art, the spring arm can be designed with smaller component dimensions and reduced material use and thus be manufactured significantly more economically and with a smaller installation space requirement.

SUMMARY OF THE INVENTION

In an advantageous development of the locking apparatus, according to the invention, a contact surface of the spring arm for the catch area of the piston unit is designed as a side surface bordering a recess in the longitudinal plane of the spring arm, which is preferably manufactured by stamping.

In a development of the locking apparatus, according to the invention, the recess is manufactured by sectional stamping and subsequent bending of the punched area opposite the longitudinal plane of the spring arm, where the piston unit in its locked condition abuts the area that has been bent out of the longitudinal plane of the spring arm and loads the bent section in its finished bending direction from the longitudinal plane. In the latter embodiment, the holding force, applied to the piston unit, is transferred to the spring arm with a lever arm, depending on the bending radius of the bent area with respect to the longitudinal plane of the spring arm, where the lever arm is significantly smaller than with locking apparatuses known from the prior art.

To reduce a notch effect in the holding force application area of the spring arm, a punch radius is accordingly selected in the region of the contact surface of the piston unit catch area at the spring arm.

In an advantageous development of the locking apparatus, the spring arm is at least sectionally U-shaped in cross-section to increase the bending stiffness, whereby this cross-sectional shape can be manufactured economically and simply in a bending die process. The spring arm in its longitudinal plane section is preferably designed with radially and tangentially directed bends, which give the spring arm its basically U-shaped profile.

Furthermore, there is the option to form the spring arm alternatively to or in combination with the aforementioned embodiment of the spring arm at least sectionally with at least one stiffening bead that extends mainly in a longitudinal direction of the spring arm in order to be able to design the spring arm in the application area of the release element with a bending stiffness which is advantageous for the release of the action connection between the spring arm and the piston device.

Alternatively or in combination with the two aforementioned procedures which increase the bending stiffness of the spring arm, in another advantageous embodiment of the locking apparatus, the spring arm can at least sectionally be designed with at least one stiffening bend that extends mainly in a longitudinal direction of the spring arm so that the spring arm in sections has the bending stiffness which favors the release of the active connection between the spring arm and the piston device.

In an advantageous development of the locking apparatus, at least a tangential contact, but preferably a planar contact exists between the contact surface which, when the spring arm is installed, is made to overlap the catch area of the piston unit and the catch area of the piston unit. This will reduce the surface pressure between the spring arm and the piston unit in the overlapping region between the contact surface and the catch area in comparison with a point-shaped contact surface to such an extent that economical and light-weight materials, such as aluminum-based materials, can be used to manufacture the piston unit.

In an advantageous development of the locking apparatus, when the locking apparatus is activated, the effect of the surface pressure reduction is increased by designing the spring arm in the region of its contact surface with a contour that is adapted to the exterior form of the piston unit such that the degree of overlap, between the catch area of the piston unit and the contact surface of the spring arm, is maximal.

In a further advantageous embodiment of the object, the contact surface of the spring arm and the catch area of the piston unit in the overlap region are always designed such that a plane which is vertical to the direction of motion of the piston unit and a contact plane of the overlap region intersect between the catch area and the contact surface at an angle of 0° to 5°. This angle corresponds to a self-locking angle, which must be maintained for assured locking and unlocking and/or for assured activation and/or deactivation of the locking apparatus and its size always varies depending on the friction coefficient in the overlap region between the spring arm and the piston unit. The friction coefficient is the result of selected material pairing between the piston unit and the spring arm, where the size of a self-locking angle, which assures the functioning of the device will be approximately at 5° in a steel/steel pairing.

The above-mentioned contact plane of the overlap region is understood to be that plane, which is generated by the contact surface, turned toward the catch area when the contact surface abuts the catch area.

In this context, it must be pointed out that the intersection angle between the vertical plane and the contact plane of the overlap region can change under an operational load to an extent that can deviate from the aforementioned range without degrading, to an undesired extent, the function of the locking apparatus. The maximum permissible range of change of the angle, between the vertical plane and the contact plane, also depends on the friction coefficient, between the spring arm and the piston unit, so that this varies depending on the particular application.

In order to keep the force that is required to deactivate the catch device to a minimum as well as to counteract sticking of the locking apparatus in the region between the spring arm and the release element, the spring arm is designed with a guide region in the area facing the release element, over which the spring arm is guided during axial displacement of the release element against the pre-tensioning of the spring arm and is thereby pivoted from a position equivalent to the closed condition of the locking apparatus, to a position equivalent to the open condition of the locking apparatus.

To further reduce the operating force of the catch device, as well as to improve sticking prevention of the device in the area, between the spring arm and the piston unit, in a further development of the subject-matter of the invention, the release element is designed with a guide surface which is positioned at the side facing the spring arm, over which the spring arm is guided during axial displacement of the release element against the tension of the spring arm and is thereby pivoted from a position equivalent to the closed condition of the locking apparatus to a position equivalent to the open condition of the locking apparatus.

In another preferred embodiment of the locking apparatus, the guide region of the spring arm and the guide surface of the release element interact with one another in such a manner that, during axial displacement of the release element, the spring arm is guided with its region area against the pretensioning of the spring arm over the guide surface of the release element and is thereby pivoted from a position equivalent to the engaged condition of the locking apparatus, to a position equivalent to the open condition of the locking apparatus.

BRIEF DESCRIPTION OF THE DRAWINGS

The invention will now be described, by way of example, with reference to the accompanying drawings in which:

FIG. 2A is an illustration of the piston unit and of the spring arm corresponding to FIG. 2;

FIG. 2B is the spring arm, illustrated in FIG. 2, in a top view as a single component;

FIG. 8A a top view of an additional embodiment of a spring arm of the locking apparatus, according to FIG. 1;

FIG. 8B the spring arm, according to FIG. 8A, in a cross-sectional view, according to line VIIIb-VIIIb;

FIG. 9A is a further embodiment of the spring arm of the locking apparatus according to FIG. 1, shown as a single component in a top view;

FIG. 9B is a cross-sectional view of the spring arm, according to FIG. 9A, along line IXb-IXb;

DETAILED DESCRIPTION OF THE INVENTION

Figure 1:
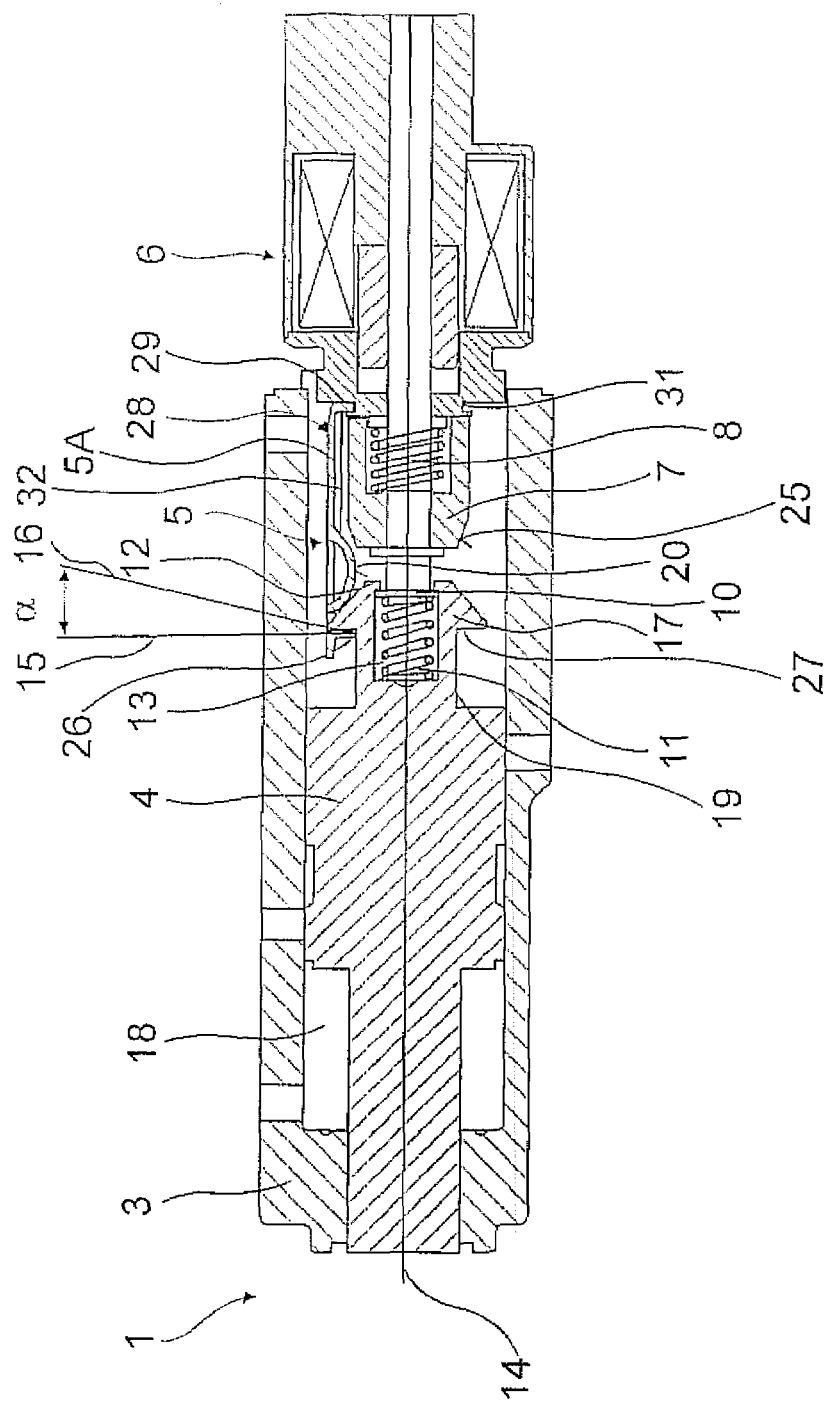
FIG. 1 is a schematic longitudinal sectional view through a locking apparatus according to the invention.

A schematized longitudinal, sectional view of a locking apparatus 1 of a parking brake device for a vehicle, whose drivetrain is equipped with an automatic transmission, is shown in FIG. 1. The locking apparatus 1 exhibits a piston unit 4 (not further illustrated), which can be driven by a fluid and which, depending on the fluid pressure counter to a spring device (not further illustrated), acting in the locking direction of the parking brake device, can be actuated in the opening direction of the parking brake device and which is displaceably positioned in an axial direction inside a housing 3.

The piston unit 4, in its mounted state, is connected with a parking rod of the parking brake device in a manner that is not further illustrated, whereby the parking rod is, in turn, actively connected with a parking brake lever in such a manner that the parking brake lever, due to an axial movement of the piston unit and the connected parking rod, can be engaged with a parking brake wheel, which is non-rotatably connected with the power take-off of the drivetrain or disengaged from the parking brake wheel.

The locking apparatus 1 is furthermore equipped with a catch device 5, which automatically activates at a predefined position of the piston unit 4, to hold the piston unit 4 in the predefined position. The locking apparatus 1 is additionally designed with an electromagnetic actuating device 6 to actuate a release element 7, which is provided to deactivate the catch device 5 and is connected with a piston rod 8 and together with the piston rod 8 is longitudinally moveable in the interior of the housing 3.

The piston rod 8, at the end facing the piston unit 4, is connected with the piston unit 4, via a spring ring 10, whereby in the axial direction the spring ring 10 is pressed against an interior stop 12 of the piston unit 4 by a spring element 11. This means that within constructively predetermined tolerances a relative movement against the spring force of the spring element 11 is possible between the piston rod 8 and the piston unit 4, since the piston rod 8 plunges with its end facing the piston unit 4 into a bore hole 13 of the piston unit 4, where the spring element 11 is also positioned.

Furthermore, the piston unit 4 at the end, turned away from the piston rod 8, is in an active connection with the parking brake device (not further illustrated) and an emergency release device (likewise not further illustrated), in such a manner that the piston unit 4 can be displaced, via the emergency release device, from the axial position, which is equivalent to the engaged condition of the parking brake device to the axial position, which is equivalent to the disengaged condition of the parking brake device.

Additionally, the piston rod 8 with the end turned away from the piston unit 4 is in an active connection with the emergency release device, by which the piston rod 8 and the connected release element 7 can be manually displaced by an operator and/or driver of the vehicle in the direction of the piston unit 4 as necessary in order to engage the parking brake device.

In normal operational mode, during which the piston unit 4 can be acted on with a fluid pressure, and the electromagnetic actuating unit can be powered, the locking apparatus 1, shown in FIG. 1, has the following function.

Based on an operating state, illustrated in FIG. 1, during which the release element 7 with its end facing the electromagnetic actuating device 6 abuts the latter, and an at least approximately conical region 17 of the piston unit 4, is enclosed by the catch device 5, the piston unit 4 is positioned in an axial position, which is equivalent to the disengaged condition of the parking brake device.

The catch device 5 is activated in the condition of the locking apparatus 1, illustrated in FIG. 1, so that the piston unit 4 is held by a spring arms 5A of which only one of preferably three spring arms equally distributed over the circumference of the piston unit 4 is illustrated in FIG. 1, in such a manner that spontaneous engagement of the parking brake lever can assuredly be prevented even if there is no fluid pressure in a ring space 18.

If the parking brake device is to be engaged, based on driver command, which is preferably issued by way of a transmission range selection device, the electromagnetic actuating device 6 is electrically powered in such a manner that the release element 7, together with the piston rod 8, is displaced in the direction of the piston unit 4 from the position, illustrated in FIG. 1, between the spring arm 5A of the catch device 5. Here as the displacement distance grows, the release element 7, with its end facing the piston unit 4, the end being designed with a cone-shaped or conical guide area 25, engages with a guide area 20 of the spring arm 5A, the guide area corresponding to the guide surface 25 of the release element 7 and being at least somewhat cylindrical, in such a manner that the spring arm 5A is pressed increasingly further toward the outside by the release element 7 against the component's own and the radially inward-directed pre-tensioning of the spring arm 5A, until the non-positive engagement between the catch device 5 and the piston unit 4, between a contact surface 26 of the spring arm 5A and a catch area 27 of the piston unit 4, which connects to a reduced diameter region 19, is eliminated.

If a resultant force component acting in the direction of the parking brake device, the force component consisting of the spring tension of the spring device acting upon the piston unit 4 and the fluid pressure that is currently available in the ring space 18, is applied to the piston unit 4, it will be displaced by the electromagnetic actuating device 6 until the parking brake device is engaged. When the parking brake device is engaged, the piston unit 4 will be displaced out of the engagement area of the spring arm 5A so that the catch device 5 is deactivated.

The electric power of the electromagnetic actuating device 6 is subsequently shut off, causing the release element 7 to be pressed again against a contact plane 16 of the catch device 5 by the spring tension of the spring element 11, in the manner illustrated in FIG. 1. Since the spring arm 5A is designed with a pre-tension that acts in the direction of a center axis 14 of the device 1, the spring arm 5A will fold in a radial direction around a joint area 28 towards the inside.

In the aforementioned condition of the apparatus 1, if the ring space 18 is acted on with a fluid pressure such that the resultant force component applied to the piston unit 4 acts in the direction of the release element 7, the piston unit 4 is then displaced from its axial position, which is equivalent to the engaged condition of the parking brake device, in the direction of the electromagnetic actuating device 6 until the catch device 5 is activated in the way described below.

Based on the fluid pressure predominating in the ring space 18 that is bounded by the housing 3 and the piston unit 4, and which can be hydraulic or pneumatic, the piston unit 4 is displaced from its axial position, which is equivalent to the engaged condition of the parking brake device, in the direction of the electromagnetic actuating device 6. During the axial displacement of piston unit 4, the catch device 5 spring arm 5A, folded in the direction of the center axis 14 of the apparatus 1, proceeding from their ends facing the piston unit 4, with increasing displacement distance of the piston unit 4 are guided over the cone-shaped or conical region 17 of the piston unit 4 at the end of the piston unit 4 facing the actuation device 6.

Due to the pre-tensioning of the spring arm 5A acting in the direction of the piston unit 4, after moving over the conical region 17 at the piston unit 4 in a reduced diameter region 19 of the piston unit 4, the spring arm with contact surface 26 facing the piston unit will come into contact with the catch region 27 behind the conical region 17. Since both the spring arm 5A with their contact surfaces 26 as well as the piston unit 4 with its catch area 27 are designed with recesses that face one another and when the catch device 5 is activated are provided as contact regions between the spring arm 5A as well as the piston unit 4, the piston unit 41 despite a resultant force component acting upon it in the direction of closure of the locking apparatus, is held by the catch device 5 in the position, illustrated in FIG. 1, owing to the non-positive connection in the region of the recesses between the spring arm 5A and the piston unit 4.

The resultant force component, which acts in the engagement direction of the parking brake device, then engages the piston unit 4 when the spring tension of the spring device is greater than the hydraulic or pneumatic pressure of the ring space 18 that acts upon the piston unit 4.

Furthermore, the locking apparatus 1, illustrated in FIG. 1, is designed such that, during a system failure of the control system that is required for the previously described operating mode, when there is neither fluid pressure in the ring space 18 to operate the piston unit 4 nor electrical power for the electromagnetic actuating device 6, the locking apparatus 1 will remain in its most recently assumed condition, i.e., either disengaged or engaged. In order that the parking brake device still be controllable, the emergency release device and the emergency locking apparatus are provided, which offer a driver the option to manually unlock the currently engaged parking brake device or to manually engage the currently disengaged parking brake device.

Five different embodiments of the locking apparatus 1, according to the invention as shown in FIG. 1, are illustrated in FIG. 2 through FIG. 5, where both the piston unit 4 and the spring arm 5A are designed differently in places, as described below, in order to assure the above described functioning mode of the locking apparatus 1.

Figure 2:
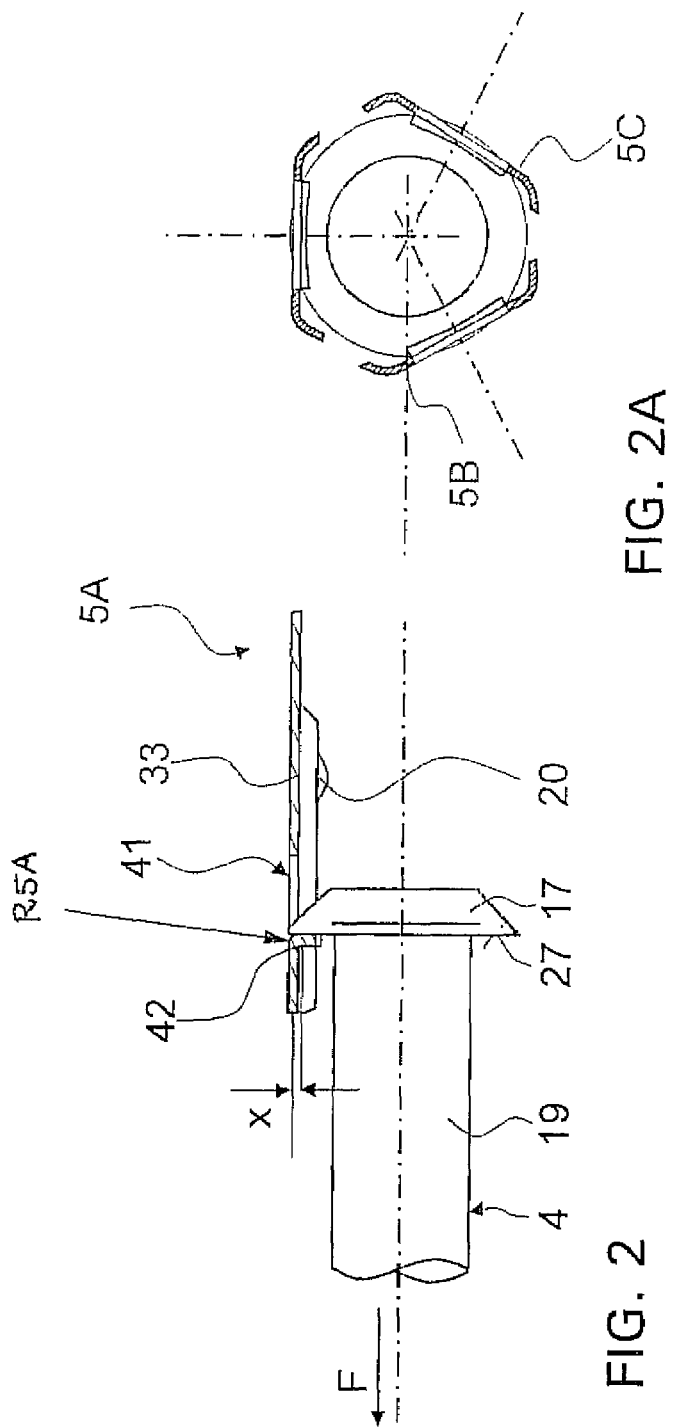
FIG. 2 is a schematized individual view of the piston unit and of one spring arm of the locking apparatus, according to FIG. 1, in a longitudinal sectional view.
Figure 3:
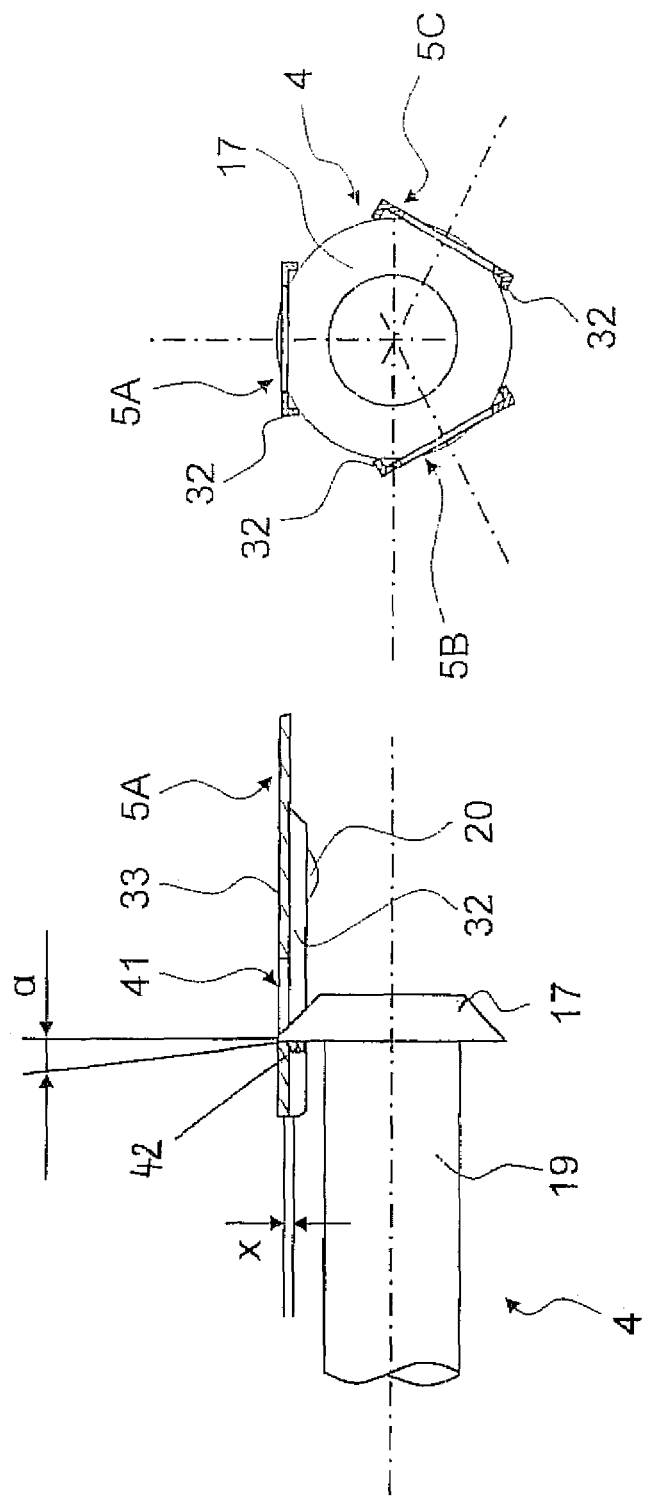
FIG. 3A is an illustration, corresponding to FIG. 2, of a second embodiment of the device according to FIG. 1.
FIG. 3B is the piston unit as illustrated in FIG. 3A and the spring arm in a side view.
Figure 4:
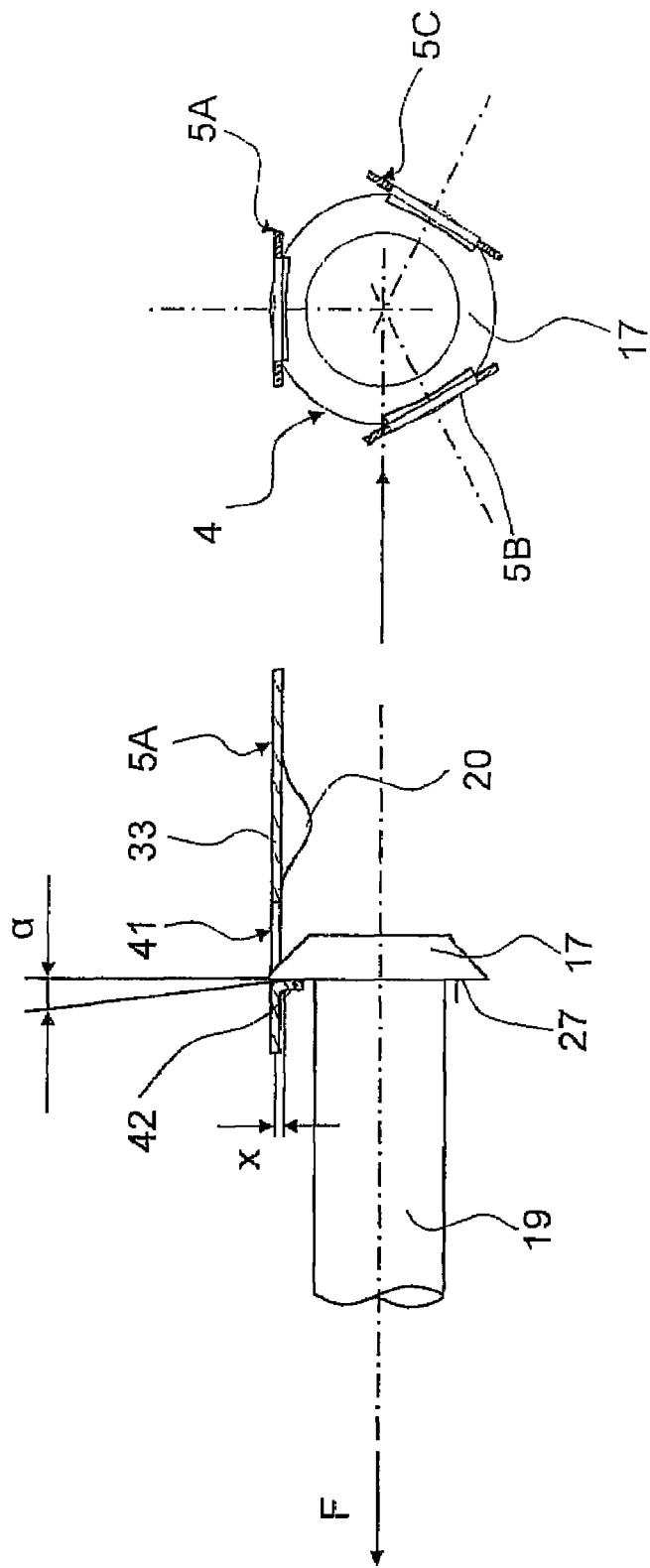
FIG. 4A is an illustration, corresponding to FIG. 3A, of an additional embodiment of the apparatus according to FIG. 1.
FIG. 4B is an illustration, corresponding to FIG. 3A of the piston unit and the spring arm, according to FIG. 4A.
Figure 5:
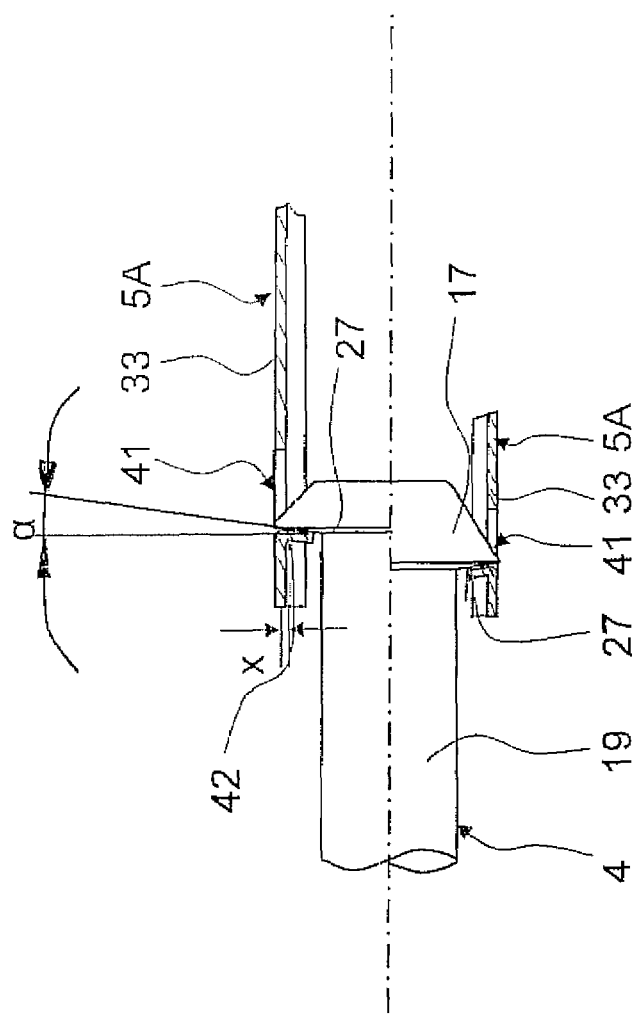
FIG. 5 is two different embodiments of the piston unit, each with interacting spring arms, where the catch area, at least sectionally, is conical.

The different embodiments, illustrated in FIG. 2 through FIG. 5 of the spring arm 5A and the piston unit 4, essentially differ in the region of the contact surface 26 as well as in the catch area 27 of the piston unit 4 so that the description of the second, third, fourth and fifth embodiment of the locking apparatus 1 only addresses in more detail the differences with respect to the first embodiment of the spring arm 5A and the piston unit 4, illustrated in FIG. 2 through FIG. 2B.

In further reference to FIG. 2, which shows the spring arm 5A and the piston unit 4 by themselves in a longitudinal section, the design of the spring arm 5A, combined with the illustration of FIG. 2A, which shows a side view of the piston unit 4 and three spring arms 5A through 5C actively connected with it, as well as combined with the illustration of FIG. 2B, which shows a top view of the spring arm 5A, according to FIG. 2A and FIG. 2B, is further explained.

The spring arm 5A, illustrated in FIG. 2, has a longitudinal support region 33, which essentially forms a longitudinal plane of the spring arm 5A. A recess 41 is punched out of the longitudinal support area 33 where at least a part of the punched-out area is bent in the form of a lug 42 by at least 90° with respect to the longitudinal support area 33 and/or the longitudinal plane of the spring arm 5 towards the piston unit 4. The catch area 27 of piston unit 4 lies flush against the spring arm 5A at the contact surface 26, which is formed by the lug 42, and is held in the position, illustrated in FIG. 2, against a holding force which is marked by arrow F.

The conical region 17 of the piston unit 4 in its largest diameter region is designed with a diameter such that the piston unit 4 with its conical region 17 at least approximately extends through the recess 41 of the spring arm 5A in a radial direction. This has the effect that the catch area 27 of the piston unit 4, in a locked state of the piston unit 4, is positioned in an area that is at least close to the longitudinal plane of the spring arm 5A and the holding force is applied to the spring arm 5A with a lever arm x, which represents only a small distance with respect to the longitudinal plane of the spring arm 5A. Thus only a small bending moment is applied to the spring arm 5A by the holding force.

At the same time, the holding force F stresses the spring arm 5A in the area of the lug 42, i.e., also at its bent section that constitutes a predetermined breaking point, in the bending direction provided during the manufacturing of spring arm 5A. Thus the spring arm 5A in the bending area of lug 42 in a simple manner features a longer lifetime, since the lug is not stressed by the holding force counter to the bending direction during bend forming and residual manufacturing stresses in the bending region.

As illustrated in the embodiment in FIG. 1 and FIG. 2 of the spring arm 5A, the lever arm x is created from a bending radius R5A of the bending area of lug 42 that faces the conical section of piston unit 4, since a linear contact and/or a planar contact between the spring arm 5A and the catch area 27 of the piston unit 4 is present only after the transition from the bending radius R5A to the flat contact surface 26.

In order to displace the flat contact and/or linear contact between the spring arm 5A and the piston unit 4 directly into the longitudinal plane of spring arm 5A, further processing of the spring arm 5A is needed in order to eliminate the bending radius in the area of the longitudinal plane. This can be accomplished, for instance, by milling, grinding or similar processing methods, but this, in turn, will increase the manufacturing costs of the spring arm 5A.

The illustration in FIG. 2A shows that, along with the spring arm 5A illustrated in FIG. 2, two additional identically designed spring arms 5B and 5C, equally spaced around piston unit 4, also hold the piston unit 4. Additionally, the illustration, according to FIG. 2A, shows that the lugs 42 of the spring arms 5A through 5C in the area of free ends 21 facing the piston unit 4 have circular-segment-like recesses, so that the spring arms 5A, 5B and 5C can flex in the manner required for locking the piston unit 4 in the direction of the reduced diameter region 19 of the piston unit 4, without resting on the latter before the catch area 27 is basically positioned in the longitudinal plane of the spring arms 5A through 5C and the lever arm x assumes an unfavorably large value.

FIG. 2B shows the spring arm 5A, according to FIG. 2 and FIG. 2A, in a top view that further illustrates the embodiment of the recess 41 in the area of lug 42 which is advantageous for a notch effect. Here the punch contour of the recess 41 in the area of lug 42 is illustrated with punch radii R41A, R41B necessary for a small notch effect.

FIGS. 3A and 3B show a second embodiment of the locking apparatus 1, according to the invention according to FIG. 1.

In addition to the recess 41, the spring arms 5A and/or 5B and 5C also have bends 32 in the longitudinal support area 33 in order to increase the bending stiffness of the spring arm 5A and/or the spring arms 5B and 5C in a longitudinal direction, while the bends 32 can be optionally shaped with a right angle or rounded in order to provide the smoothest possible transition to the longitudinal support area 33.

Additionally, the present design provides that the contact surface 26 in relation to the catch area 27, which is basically disposed vertically to the longitudinal axis of the piston unit 4, can be designed with a locking angle α, which can be provided within a range of 0° to 5°. The self-locking angle α permits simple adjustment of the locking force, which opposes the release of the locking apparatus 1 depending on the particular application. In the process, for a self-locking angle of 0°, a planar contact is present that increases the locking force, between the contact surface 26 of the spring arm 5A and the catch area 27 of the piston unit 4, while for self-locking angles greater than 0° there is a linear contact that further increases the surface pressure and simultaneously reduces the locking force between the piston unit 4 and the spring arm 5A.

FIG. 4A and FIG. 4B show a third exemplary embodiment of the locking apparatus 1, according to FIG. 1, which is basically similar to the second exemplary embodiment, according to FIG. 2 through FIG. 2B, where the self-locking angle α is provided to reduce the locking force in the region of the lug 42 opposing the release force of the locking apparatus 1. This means that the lug 42, on the side in catch area 27 facing away from the piston unit 4, encloses an angle between 90° and 95° in order to reduce the locking force, whereby the value of the lever arm x increases with an increase in the self-locking angle α. Furthermore, the spring arm 5 has no bends 32 in the longitudinal support area 33. Costs are reduced and targeted influence can be exerted on the bending line of spring arm 5.

Another option is to vary the self-locking angle α, the corresponding constructive measures both in the area of contact surface 26 as well as in the catch area 27 of the piston unit 4 in order to reduce the locking force. In such cases, the catch area 27 is conically designed in the manner illustrated in FIG. 5 and encloses with a plane which is vertical to the longitudinal axis of piston unit 4, an acute angle between 0° and 5°. At the same time, the lug 42 is bent with respect to the longitudinal support area 33 in such a manner that the lug 42 encloses an angle that is smaller than 90° with the longitudinal support area 33 on the side facing away from the catch area 27. Here it is provided that the self-locking angle α, which results from the bending angle of lug 42 with respect to the longitudinal support area 33 and the conical design of catch area 27, preferably does not exceed 5°.

FIG. 6A through FIG. 9B show different embodiments, according to the invention, of a spring arm 5A which is designed with a different bending stiffness in different areas in order to assure the prescribed functionality of the locking apparatus 1.

Figures 6A, 6B:
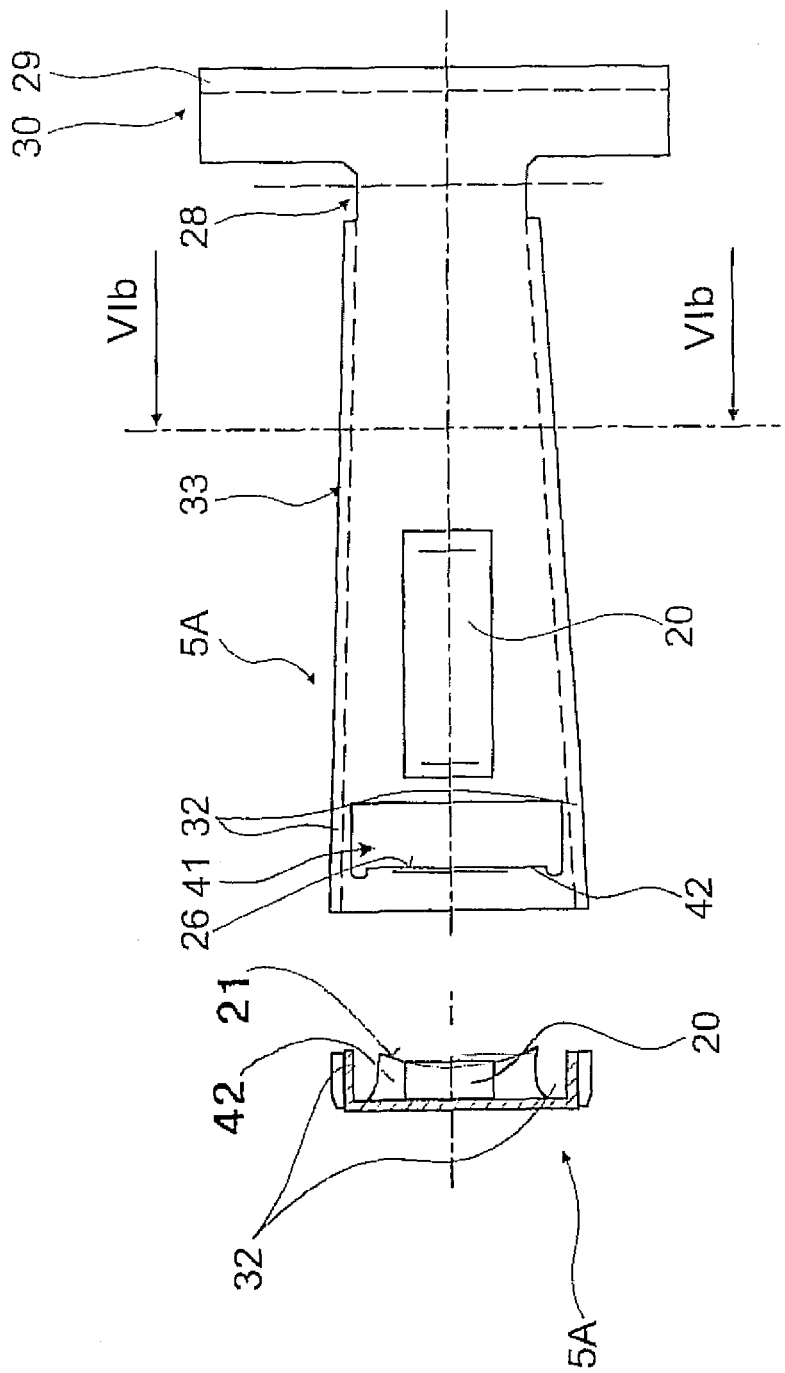
FIG. 6A is a top view of a spring arm of the locking apparatus, illustrated in FIG. 1.
FIG. 6B is a cross-sectional view of the spring arm, according to FIG. 6A, along line VIb-VIb.

The various additional embodiments of the spring arm 5A that are illustrated in FIG. 6A through FIG. 9B differ mainly in the procedures that are selected to increase the bending stiffness so that in the description of the embodiment of the spring arm 5A, according to FIG. 7A through 9B, only further reference is made only to the differences of the embodiment of spring arm 5A, illustrated in FIGS. 6A and 6B.

Additionally, with reference to FIG. 6A, which shows a spring arm 5A by itself in a top view, the design of spring arm 5A is further explained in association with an illustration of FIG. 6B, which shows a cross-sectional view of spring arm 5A, according to FIG. 6A along line VIb-VIb.

The spring arm 5A basically has a T-shaped design, whereby a transverse support area 30 of the spring arm 5A in an installed position, is inserted into a groove 31 of the actuating device 6 that is secured to the housing 3 of the apparatus 1 and, during normal operation of the apparatus 1, cannot be detached from the apparatus. The transverse support area 30 is designed with a retention section 29 which is illustrated in FIG. 1 and bent by essentially 90°, whose free end is positioned at least partly in the groove 31 of the actuating device 6 and secured by press fitting to the latter.

Connected to the transverse support area 30 is the joint area 28, which is positioned between the transverse support area 30 and the longitudinal support area 33 of the spring arm 5A. Due to the previously described functionality of the spring arm 5A, the joint area 28 is designed with a lower bending stiffness than the longitudinal support area 33 so that the spring arm 5A can be radially pivoted around the joint area 28 by the release element 7 in the manner that is further described in FIG. 1. The longitudinal support area 33 is designed with a steadily increasing width from the joint area 28 to the end and, in the area of its longitudinal sides, is designed with bends 32 so that the longitudinal support area 33 has an at least approximate U-shaped section.

The joint area 28 of the spring arm 5A in the present case has basically the same width and no bends and, therefore, exhibits a lower bending stiffness in comparison with the longitudinal support area 33, which provides the component elasticity for the spring arm 5A in the joint area 28 that is desired and/or required for pivoting of the lug 42.

Due to the steadily increasing width and the U-shaped profile of the longitudinal support area 33, the spring arm 5A in the longitudinal support area 33 has a bending stiffness such that the degree of deformation of the spring arm 5A during deactivation of the catch device 5 is smaller than the degree of deformation that prevents the release of the active connection between the spring arm 5A and the piston unit 4, whereby in this regard, reference is made to the description below of FIG. 10 through FIG. 13 which further illustrates this subject.

Additionally, the lug 42 of the spring arm 5A, in the area of its free end 21 facing piston unit 4, is designed with a circular segment shape, which is adapted to the cylindrical contour of piston unit 4 in the reduced diameter area 19 such that the spring arm 5A in the area of the free end 21 of lug 42 basically abuts the arc of the covering surface of the reduced diameter area 19 of piston unit 4. This optimizes an area of the overlap region between the catch area 17 of the piston unit 4 and the contact surface 26 of the spring arm 5A in comparison with a straight embodiment of the free end 21 of lug 42 such that the surface pressure in the overlap region is small and the piston unit 4 in the catch area 27 can be designed with a reduced component strength with regard to such a load.

In the present case, the catch area 27 of piston unit 4 with the covering surface of the reduced diameter area of piston unit 4 includes an angle of 90°. It is further provided that the lug 42 is designed with such a degree of elasticity that the contact surface, between lug 42 and the catch area 27 in activated state of the catch device 5, will assume a value that is as large as possible. That means that when the catch device 5 is in an activated state, the lug 42 is deformed to such a degree that in the overlap region of the spring arm 5A and the piston unit 4 at least one linear, but preferably a planar contact, is established and the surface pressure is minimal.

This also means that the lug 42 and the catch area 27 interact in the overlap region in such a manner that a plane 15, vertical to the directional movement of the piston unit 4 which, in the present case, also encloses an angle of 90° with the coverage area of the reduced diameter area 19 and a contact surface 16 of the overlap region between the catch area 27 and the lug 42 intersect at a self-locking angle $\alpha$ which is necessary for trouble-free functioning of the apparatus 1. The self-locking angle $\alpha$, illustrated in FIG. 1, varies depending on a friction coefficient between the contact surface 26 of the spring arm 5A and the catch area 27 which, depending on the particular application, is between 0° and 5°. A self-locking angle of around 5° is, therefore, advantageous for the functionality of the apparatus 1, when both the spring arm 5A and the piston unit 4 in the overlap region of both components are made from steel.

Figures 7A, 7B:
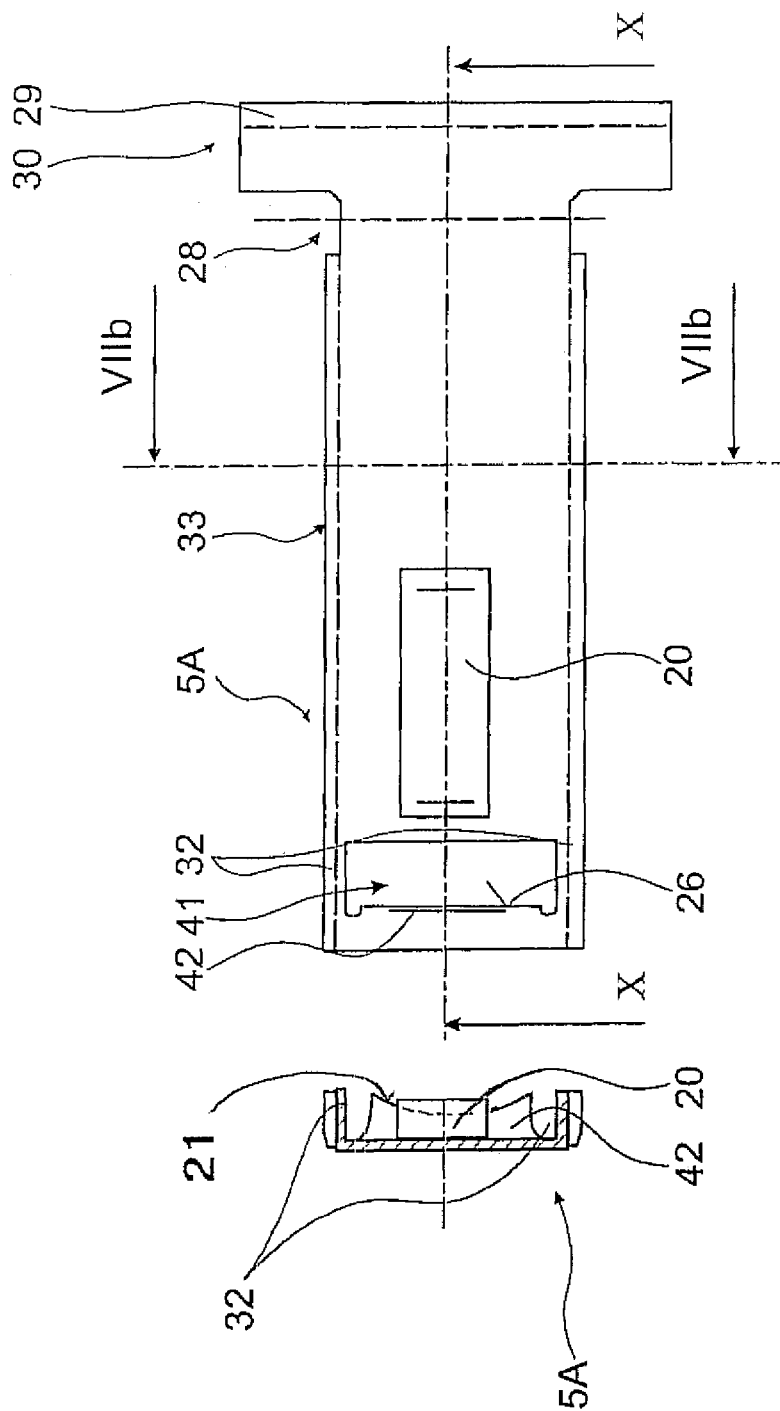
FIG. 7A is an alternative embodiment of the spring arm of the locking apparatus, according to FIG. 1, shown in FIG. 6A.
FIG. 7B is a cross-sectional view of the spring arm, according to FIG. 7A, along line VIIb-VIIb.

In the embodiment of the spring arm 5A, illustrated in FIG. 7A, the longitudinal support area 33, in contrast to the spring arm 5A, shown in FIG. 6A, is designed with a fixed width. Apart from that the spring arms, according to FIG. 6A and/or according to FIG. 7A, have the same design. FIG. 7B shows the spring arm 5A, according to FIG. 7A, in a cross-sectional view along line VIIb-VIIb with bends 32 and/or folds which, in the installed state of spring arm 5A, are directed radially towards the release element 7. It is naturally up to the skilled person's discretion to fold the bends 32 in the opposite direction in order to increase the bending stiffness of the longitudinal support area 33 in the desired manner.

FIG. 8A shows a further embodiment of a spring arm 5A in an illustration according to FIGS. 7A and 7B. The spring arm 5A, according to FIG. 8A, is designed in the longitudinal support area 33 with two stiffening beads 34, which extend in the longitudinal direction of the spring arm 5A and which are each positioned next to the guide area 20 processed from the longitudinal support area 33 in a punching and bending process, and basically extend over the entire length of the longitudinal support area 33. The embodiment of the stiffening beads 34 is further illustrated in the cross-sectional view according to FIG. 8B, along line VIIIb-VIIIb and can be manufactured in the longitudinal support area 33 in a simple and economical manner.

FIG. 9A shows another exemplary embodiment of the spring arm 5A of the apparatus 1, which basically differs from the exemplary embodiments illustrated in FIG. 6A through 8B only in the longitudinal support area 33. The longitudinal support area 33 of the spring arm 5A, according to FIG. 9A, is basically designed in two parts, whereby a first section 33A is disposed between the joint area 28 and a second section 33B, which is designed with the guide area 20 and the recess 41. A first section 33A from the joint area 28 to the second section 33B is formed with a steadily increasing width as well as with two parallel longitudinal support areas 33 running to the outsides from the surface of stiffening areas 35A and 35B, which have been punched on one side and bent downward, whereby the stiffening areas 35A and 35B extend to the second section 33B of the longitudinal support area 33. The second section 33B of the longitudinal support area 33 is designed with a fixed width in the longitudinal direction and on its outsides is designed with bends 32 in the same manner as the spring arms 5A, according to FIG. 6A and/or FIG. 7A, so that the second section 33B of the longitudinal support area 33 is at least approximately U-shaped in the manner illustrated in FIG. 9B, where the spring arm 5A is, shown according to FIG. 9A, in a cross-sectional view along line IXb-IXb.

Figure 10:
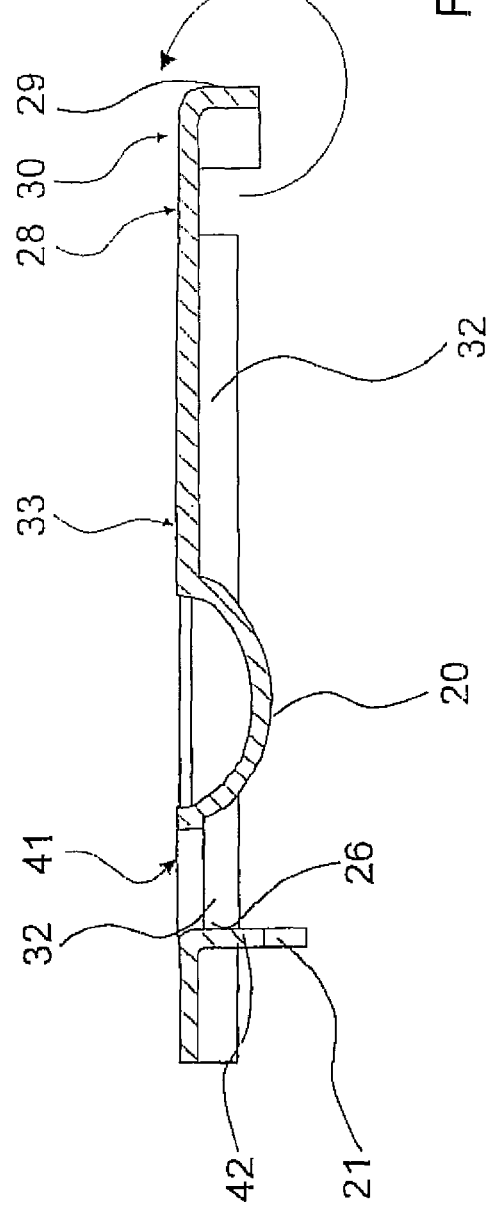
FIG. 10 is a longitudinal sectional view of the spring arm, illustrated in FIG. 7a, along line X-X.

FIG. 10 shows the spring arm 5A, illustrated in FIG. 7A, in a longitudinal view along line X-X in an unloaded state. The lug 42 and the longitudinal support area 33 of the spring arm 5A in unloaded state enclose at least approximately a 90° angle.

Figure 11:
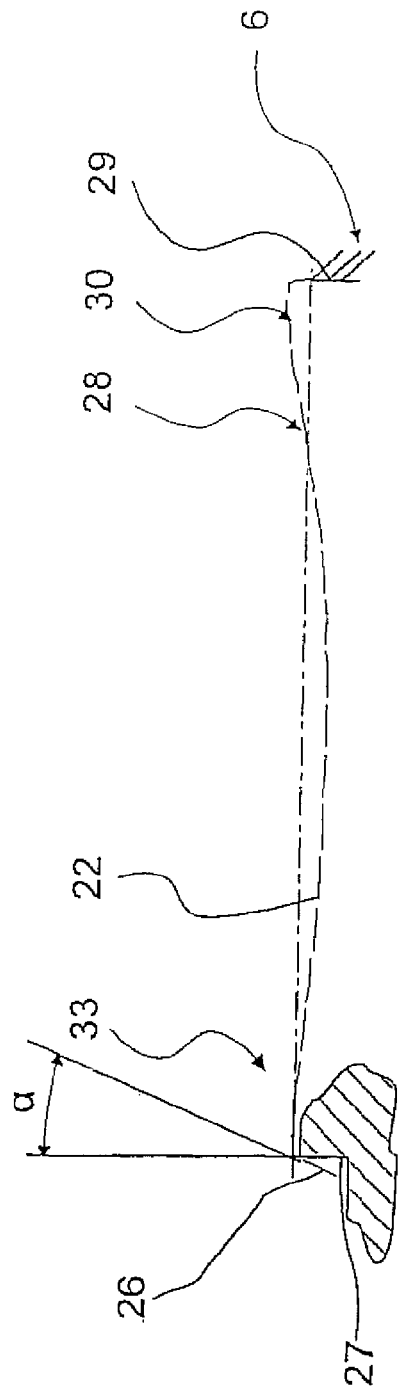
FIG. 11 is a bending line that corresponds to the spring arm, illustrated in FIG. 10, which guarantees the functioning of the locking apparatus.

Additionally, FIG. 11 shows a bending line 22, which adjusts under load, i.e., during actuation of the spring arm 5A according to FIG. 10, by the release element 7 that guides the spring arm 5A out of engagement with the piston unit. From illustration according to FIG. 11, it is evident that under a load the spring arm 5A, according to FIG. 10, is basically deformed over its entire length at least approximately parabolically. The transverse support area 30, the longitudinal support area 33 and the lug 42 are deformed such that under a load the lug 42 assumes the arrangement that is necessary for maintaining the self-locking angle $\alpha$ in relation to the catch area 27 of the piston unit 4. This allows the option of designing the spring arm 5A in such a manner that the angle between the lug 42 and the longitudinal support area 33 changes under a load such that the self-locking angle α necessary for a trouble-free release of the active connection between the spring arm 5A and the piston unit 4 is assured.

Notwithstanding the above, the spring arm 5A in the transitional area between the lug 42 and the longitudinal support area 33 can also be designed with stiffness such that the angle between the lug 42 and the longitudinal support area 33 does not change under a load and the self-locking angle α is created in the overlap region due to a corresponding deformation of the other sections of the spring arm 5A.

Figure 12:
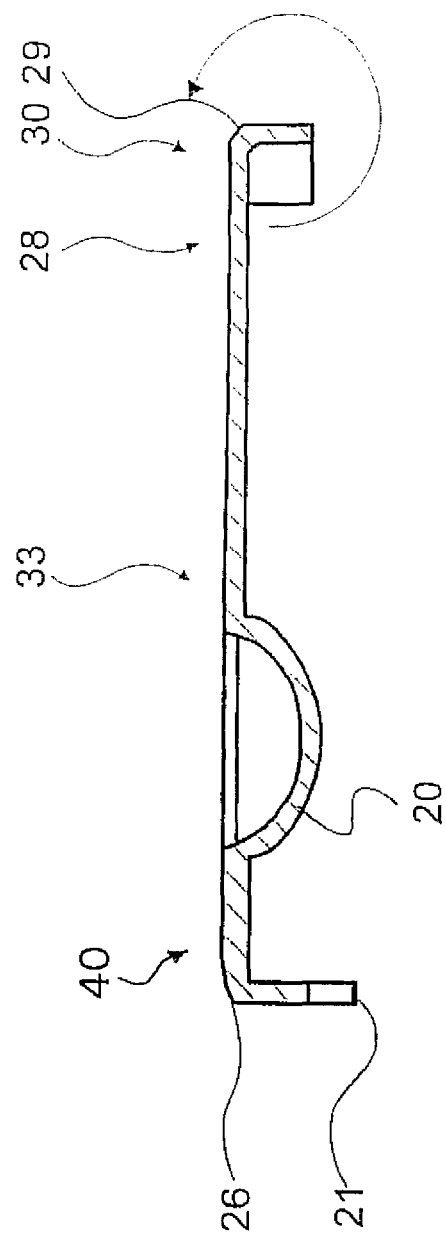
FIG. 12 is a spring arm, which basically has the same bending stiffness over its entire length.

FIG. 12 shows an illustration of a spring arm 40 that corresponds to FIG. 10, which, in contrast to the spring arm 5A that is shown in FIG. 10, in the longitudinal support area 33 is designed without the above described stiffening measures, without the recess 41 and without lug 42 so that the spring arm 40 is designed over its entire length with a mainly constant bending stiffness and the holding force is applied to the spring arm 40 by a large lever arm x.

Figure 13:
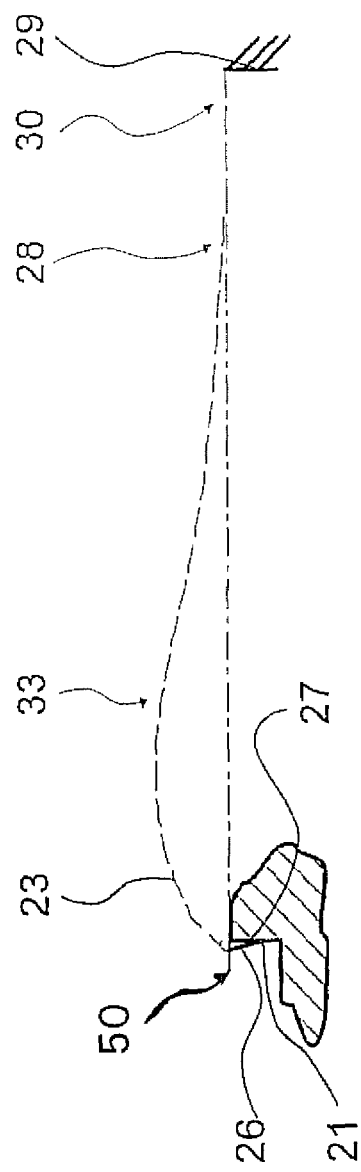
FIG. 13 is a bending line that corresponds to the spring arm, illustrated in FIG. 12, which impairs the functioning of the apparatus to an undesirable extent.

FIG. 13 represents a bending line 23 of the spring arm 40, which is created during actuation of the spring arm 40 by the release element 7, i.e., under a load, during deactivation of the catch device 5.

A closer inspection of the bending line 23 of the spring arm 40 reveals that the spring arm 40 exhibits a significant bulge in the application area of the release element 7, i.e., in the guide area 20 of the spring arm 40, so that a claw area 50, which abuts the widest possible catch area 27 of the piston unit 4 in an activated state of the catch device 5, is pivoted strongly about its free end 21 away from the catch area 27, as shown in FIG. 13, and the self-locking angle α necessary for trouble-free functioning of the apparatus 1 no longer exists between the claw area 50 and the catch area 27.

The degree of deformation, illustrated in FIG. 13, is disadvantageous in that the self-locking angle α in the overlap region, between the claw area 50 of the spring arm 40 and the piston unit 4, is changed so significantly that, due to excessive friction coefficients in the overlap region between the claw area 50 of the spring arm 40 and the catch area 33 of the piston unit 4, the spring arm 40 can no longer be disengaged from the piston unit 4 and thus functional blocking of the locking apparatus 1 can hardly be avoided. In this case, the transverse support area 30 and the claw area 50 of the spring arm 40 disadvantageously constitute fixing points of the spring arm 40, between which the spring arm 40 is deformed by the release element 7 that acts upon the guide area 20 in the manner illustrated in FIG. 13, without deactivating the catch device 5.

The claw area 50 of the spring arm 40 is also stressed, counter to the bending direction that was provided during its manufacture. This stress is disadvantageous and leads to an undesirable reduction of the lifespan of the spring arm since the bent area between the longitudinal support area 33 and the claw area 50 represents a predetermined breaking point, whose strength when stressed counter to the designed bending direction is significantly less than when it is stressed in the design bending direction, as was provided in the locking apparatus 1 according to the invention.

REFERENCE NUMERALS 1 apparatus
3 housing
4 piston unit
5 catch device
5A spring arm
5B spring arm
5C spring arm
6 actuating device
7 release element
8 piston rod
10 spring ring
11 spring element
12 interior stop
13 bore hole
14 center axis
15 vertical plane
16 contact plane
17 conical area of the piston unit
18 ring space
19 reduced diameter area of the piston unit
20 guide area of the spring arms
21 free end of the lug
22 ending line
23 bending line
25 guide area of the release element
26 contact surface
27 catch area
28 joint area
29 retention section
30 transverse support area of the spring arm
31 groove
32 bends
33 longitudinal support area
33A first section of the longitudinal support area
33B second section of the longitudinal support area
34 stiffening beads
35A stiffening areas
35B stiffening areas
40 spring arm
41 recess
42 lug
50 claw area
R5A bending radius
R41A A punch radius
R41B punch radius
α self-locking angle
x lever arm
F holding or locking force

The invention claimed is:

1. A locking apparatus (1) of a parking brake device for a vehicle having a drivetrain with an automatic transmission, the locking apparatus comprising:
a piston unit (4) positioned inside a housing (3) and being axially displaceable and lockable in a pre-defined axial position; and
a catch device (5) being automatically activated when the piston unit (4) is in a locked position to hold the piston unit (4), the catch device (5) having at least one spring arm (5A, 5B) in active connection with the piston unit (4) when the piston unit (4) is in the locked position, the at least one spring arm being abutted by the piston unit (4) in the locked position with a catch area (27), the at least one spring arm (5A) being substantially planar and comprising a radially outer surface which defines a longitudinal plane, and the spring arm (5A) having a through hole (41) extending radially through the spring arm (5A) and the catch area (27) of the piston unit (4) extends at least partially, in a radial direction, through the through hole (41) of the spring arm (5A) so that when the piston unit (4) is in the locked position, the catch area

(27) of the piston unit (4) intersects the longitudinal plane defined by the outer surface of the spring arm (5A).

2. The locking apparatus according to claim 1, wherein a contact surface (26) of the spring arm (5A) abuts the catch area (27) of the piston unit (4) and is a side surface that limits an axial extent of the through hole (41) in the longitudinal plane of the spring arm (5A).

3. The locking apparatus according to claim 1, wherein the through hole (41) extends radially through the spring arm (5A) and is manufactured by a punch method.

4. The locking apparatus according to claim 1, wherein the through hole (41) is manufactured by sectionally punching and bending a lug (42) with respect to the longitudinal plane of the spring arm (5A), where the piston unit (4), in the locked position, contacts the lug (42), which has been bent out of the longitudinal plane of the spring arm (5A) and loads the lug (42) in the direction of bending.

5. The locking apparatus according to claim 3, wherein a punch radius (R41A, R41B) in a contact surface area has a radius which minimizes a stress placed on a lug (42) by a holding force applied on the lug (42) by the catch area (17) of the piston unit (4).

6. The locking apparatus according to claim 1, wherein the spring arm (5A), at least in sections, comprises a planar longitudinal support area (33) and radial and tangential bends (32) such that the spring arm has a substantially U-shaped cross-section.

7. The locking apparatus according to claim 1, wherein the spring arm (5A) is at least sectionally designed with at least one stiffening bead (34) that extends axially along the spring arm (5A) and laterally adjacent the through hole (41).

8. The locking apparatus according to claim 1, wherein the spring arm (5A) is at least sectionally designed with at least one stiffening area (35A, 35B) that extends basically in the longitudinal direction of the spring arm (5A).

9. The locking apparatus according to claim 1 wherein, between a contact surface (26), which when the spring arm (5A) is installed, overlaps with the catch area (27) of the piston unit (4), and at least a linear contact exists in the catch area (27) of the piston unit (4) when the catch device (5) is activated.

10. The locking apparatus according to claim 9, wherein the contact surface (26) of the spring arm (5A) has a curved contour that corresponds to a curved exterior shape of the piston unit (4) such that an area of overlap between the catch area (27) of the piston unit (4) and the contact surface (26) of the spring arm (5A) is greater in comparison to an area of overlap between the catch area (27) of the piston unit (4) and a contact surface (26) of another spring arm (5A) having a straight contour that, other than the straight contour, is identical to the spring arm (5A) having the curved contour.

11. The locking apparatus according to claim 9, wherein the contact surface (26) and the catch area (27) within a region of overlap are each designed such that a plane (15), which is normal to a direction of motion of the piston unit (4), and a contact plane (16) of the overlap region intersect between the catch area (27) and the contact surface (26) at operational load at an angle (a) of 0° to 5°.

12. The locking apparatus according to claim 1, wherein the spring arm (5A) is manufactured from spring steel.

13. The locking apparatus according to claim 1, wherein the least one spring arm (5A, 5B) is parallel to the central axis when the piston unit (4) is in the locked and an unlocked positions.

14. A locking apparatus (1) of a parking brake device for a vehicle having a drivetrain with an automatic transmission, the locking apparatus (1) comprising:

a piston unit (4) located within a housing (3) and being slidable along a central axis between a locked position and an unlocked position, the piston unit (4) having a catch (27) with a catch surface that extends essentially normal to the central axis;

a catch device (5) having at least one spring arm (5A, 5B, 5C) that is substantially planar and comprises a radially outer surface, axially opposite ends, and a through hole (41), the outer surface being radially opposite the central axis and the through hole (41) being axially located in the at least one spring arm (5A, 5B, 5C) between the axially opposite ends and radially extending completely through the at least one spring arm (5A, 5B, 5C), the outer surface of the at least one spring arm (5A, 5B, 5C) defining a longitudinal plane which is parallel to the central axis, the at least one spring arm (5A, 5B, 5C) comprises a contact surface (26) that extends radially inward from the outer surface and essentially normal to the longitudinal plane; and the catch surface of the piston unit (4) passes, via the through hole (41), through the at least one spring arm (5A, 5B, 5C) and the longitudinal plane and abuts with the contact surface (26) of the at least one spring arm (5A, 5B, 5C) to automatically engage and retain the piston unit (4) when the piston unit (4) is in the locked position.

15. The locking apparatus according to claim 14, wherein a remote end of the contact surface (26) of the at least one spring arm (5A, 5B, 5C) has arcuate contour when viewed from along the central axis.

16. The locking apparatus according to claim 14, wherein longitudinally opposite sides of the at least one spring arm (5A, 5B, 5C) comprise bends (32) that define planes which are essentially parallel to the central axis.

17. The locking apparatus according to claim 1, wherein longitudinally opposite sides of the at least one spring arm (5A, 5B, 5C) are axially bent such that the opposite sides are at an angle with respect to the longitudinal plane.

18. The locking apparatus according to claim 14, wherein the through hole (41) has a profile along the longitudinal plane which comprises punch radii located at opposite sides of the contact surface (26).

19. The locking apparatus according to claim 14, wherein the at least one spring arm (5A, 5B, 5C) is parallel to the central axis when the piston unit (4) is in the locked and the unlocked positions.

20. The locking apparatus according to claim 14, wherein the at least one spring arm (5A, 5B, 5C) comprises a portion of the at least one spring arm (5A, 5B, 5C) that is bent with respect to the longitudinal plane of the spring arm (5A), the contact surface (26) being the outer surface of the portion of the at least one spring arm (5A, 5B, 5C) that is bent with respect to the longitudinal plane, the catch surface of the piston unit (4), in the locked position, contacts the contact surface and loads the portion of the at least one spring arm (5A, 5B, 5C) that is bent with respect to the longitudinal plane.

* * * * *